US008597529B2

(12) United States Patent
Kishimoto et al.

(10) Patent No.: US 8,597,529 B2
(45) Date of Patent: Dec. 3, 2013

(54) METHOD FOR PROCESSING SUBSTRATE AND METHOD FOR PRODUCING LIQUID EJECTION HEAD AND SUBSTRATE FOR LIQUID EJECTION HEAD

(75) Inventors: Keisuke Kishimoto, Yokohama (JP); Satoshi Ibe, Yokohama (JP); Takuya Hatsui, Tokyo (JP); Shimpei Otaka, Kawasaki (JP); Hiroto Komiyama, Tokyo (JP); Hiroyuki Morimoto, Tokyo (JP); Masahiko Kubota, Tokyo (JP); Toshiyasu Sakai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 799 days.

(21) Appl. No.: 12/484,937

(22) Filed: Jun. 15, 2009

(65) Prior Publication Data

US 2009/0314742 A1 Dec. 24, 2009

(30) Foreign Application Priority Data

Jun. 18, 2008 (JP) ................................ 2008-159116
Jun. 18, 2008 (JP) ................................ 2008-159124

(51) Int. Cl.
*G01D 15/00* (2006.01)

(52) U.S. Cl.
USPC .................... 216/27; 216/56; 216/2; 438/733

(58) Field of Classification Search
None
See application file for complete search history.

(56) References Cited

U.S. PATENT DOCUMENTS

| | | | | |
|---|---|---|---|---|
| 5,937,133 | A * | 8/1999 | Moss et al. | 385/137 |
| 6,143,190 | A | 11/2000 | Yagi | |
| 2005/0176161 | A1 * | 8/2005 | Bapst et al. | 438/31 |
| 2007/0212890 | A1 * | 9/2007 | Sakai et al. | 438/733 |
| 2007/0212891 | A1 | 9/2007 | Yamamuro et al. | |

* cited by examiner

*Primary Examiner* — Binh X Tran
*Assistant Examiner* — David Cathey, Jr.
(74) *Attorney, Agent, or Firm* — Canon USA Inc. IP Division

(57) ABSTRACT

A method for processing a substrate includes preparing a substrate having a first layer on a first surface side thereof, the first layer having a material capable of suppressing transmission of laser light, processing the substrate with laser light from a second surface that is opposite the first surface of the substrate toward the first surface of the substrate, and allowing the laser light to reach the first layer to form a hole in the substrate, and performing etching of the substrate from the second surface through the hole.

14 Claims, 6 Drawing Sheets

METHOD FOR PROCESSING SUBSTRATE AND METHOD FOR PRODUCING LIQUID EJECTION HEAD AND SUBSTRATE FOR LIQUID EJECTION HEAD

BACKGROUND OF THE INVENTION

1. Field of the Invention

The present invention relates to a method for processing a substrate and methods for producing a liquid ejection head and a substrate for use in a liquid ejection head.

2. Description of the Related Art

An example of a liquid ejection apparatus configured to eject a liquid from an ejection orifice is an ink-jet recording apparatus configured to perform recording by ejecting a liquid ink onto a recording medium. The liquid ejection apparatus includes a liquid ejection head.

The liquid ejection head includes a substrate having a nozzle material layer provided on one surface of the substrate. The nozzle material layer has an ejection orifice and a nozzle configured to eject the liquid. The substrate has a liquid supply port configured to supply the nozzle material layer with the liquid. The substrate is provided with an ejection energy-generating element configured to generate energy used for the ejection of the liquid. The liquid ejection head ejects the liquid using the energy generated by the ejection energy-generating element.

As the liquid ejection head, an ink-jet head (hereinafter, referred to as a "side-shooter head") configured to eject a liquid in the direction perpendicular to the substrate has been known. The side-shooter head includes a substrate having a through hole serving as a liquid supply port. The liquid ejection head is supplied with a liquid through the liquid supply port. The liquid supply port is formed by a technique for processing a substrate.

U.S. Pat. No. 6,143,190 discloses a method for producing a side-shooter liquid ejection head. To prevent nonuniformity in the diameter of openings, the method for producing a liquid ejection head described in U.S. Pat. No. 6,143,190 includes the steps (A) to (F):

(A) forming a sacrificial layer on a portion of one surface of a substrate where a through hole will be formed, the sacrificial layer being capable of being selectively etched without etching the material of the substrate, (B) forming an etch stop layer having etching resistance so as to cover the sacrificial layer arranged on the substrate, (C) forming an etching mask layer on the other surface opposite the one surface of the substrate, the etching mask layer having an opening corresponding to the sacrificial layer, (D) etching the substrate by crystal orientation-dependent anisotropic etching until the sacrificial layer is exposed through the opening, (E) removing the sacrificial layer by etching the sacrificial layer from a portion that has been exposed in the step (D), and (F) partially removing the etch stop layer to form a through hole.

U.S. patent application serial No. 2007/0212891 discloses that in a method for producing a liquid ejection head, a blind hole is formed with laser light before anisotropic etching is performed.

In the case where a liquid supply port is formed in a substrate by etching as in U.S. Pat. No. 6,143,190, the etching may require a substantial amount of time, which may disadvantageously reduce production efficiency.

In the method for producing a liquid ejection head described in U.S. patent application serial No. 2007/0212891, the blind hole is formed in the other surface opposite one surface of the substrate with laser light before a liquid supply port is formed in the substrate by etching. However, it can be difficult to precisely control the depth of the blind hole with the laser light.

In the case where a hole extending to a portion near the one surface of the substrate is formed, the hole can pass through the substrate. In this case, a nozzle material layer arranged on the one surface of the substrate can be impaired by the laser light. It can thus be difficult to stably form a deep hole in the substrate.

SUMMARY OF THE INVENTION

According to an aspect of the invention, a method for processing a substrate is provided that includes preparing a substrate having a first layer on a first surface side thereof, the first layer having a material capable of suppressing transmission of laser light, processing the substrate with laser light from a second surface that is opposite the first surface of the substrate toward the first surface of the substrate, and allowing the laser light to reach the first layer to form a hole in the substrate, and performing etching of the substrate from the second surface through the hole.

According to another aspect of the invention, a method for producing a substrate used for a liquid ejection head is provided, the substrate having an energy-generating element on a first surface thereof and a supply port, the energy-generating element being configured to generate energy used for the ejection of a liquid, and the supply port being configured to allow the first surface to communicate with a second surface opposite the first surface of the substrate and supply the energy-generating element with a liquid. The method includes preparing the substrate having a layer on a first surface side thereof, the layer having a material capable of suppressing transmission of laser light, processing the substrate with laser light from the second surface that is opposite the first surface of the substrate toward the first surface of the substrate, and allowing the laser light to reach the layer to form a hole in the substrate, and performing etching of the substrate from the second surface through the hole to form the supply port.

According to yet another aspect of the invention, method for producing a liquid ejection head including a substrate having an energy-generating element on a first surface of the substrate is provided, the energy-generating element being configured to generate energy used for the ejection of a liquid from an ejection orifice, a flow passage-forming member being configured to form a flow passage communicating with the ejection orifice, and a supply port being configured to allow the first surface to communicate with a second surface opposite the first surface of the substrate and supply the flow passage with a liquid. The method includes preparing the substrate having a layer on a first surface side thereof, the layer having a material capable of suppressing transmission of laser light, providing a member to be a flow passage-forming member on the layer, processing the substrate with laser light from the second surface that is opposite the first surface of the substrate toward the first surface of the substrate, and allowing the laser light to reach the layer to form a hole in the substrate, and performing etching of the substrate from the second surface through the hole to form the supply port.

Further features of the present invention will become apparent from the following description of exemplary embodiments with reference to the attached drawings.

DESCRIPTION OF THE EMBODIMENTS

Figure 1A:
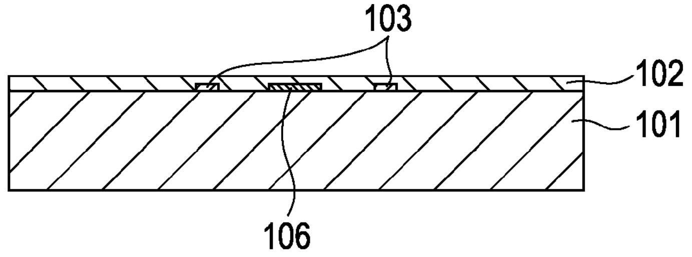
FIGS. 1A to 1D are schematic cross-sectional views of a method for producing a substrate for a liquid ejection head according to an embodiment of the present invention.

Embodiments according to the present invention will be described below with reference to the attached drawings.

An ink-jet recording head (hereinafter, referred to as a "recording head") will be described below as an example of a liquid ejection head. A liquid ejection head can also be applied in industrial and medical applications.

Elements having the same functions are designated using the same reference numerals, and descriptions thereof are not redundantly repeated in some cases. The recording head can be mounted on apparatuses, such as one or more of printers, copiers, facsimile machines having communication systems, word processors having printing units, and industrial recording apparatuses integrally combined with various processing units. Recording can be performed on various recording media, such as at least one of paper, yarn, fibers, cloth, leather, metals, plastic, glass, wood, and ceramics with the recording head. The term "recording" used in this specification includes not only applying meaningful images (i.e., images having information content), such as characters and symbols, but also applying meaningless images (i.e., decorative or ornamental images) such as patterns on recording media.

Figure 3:
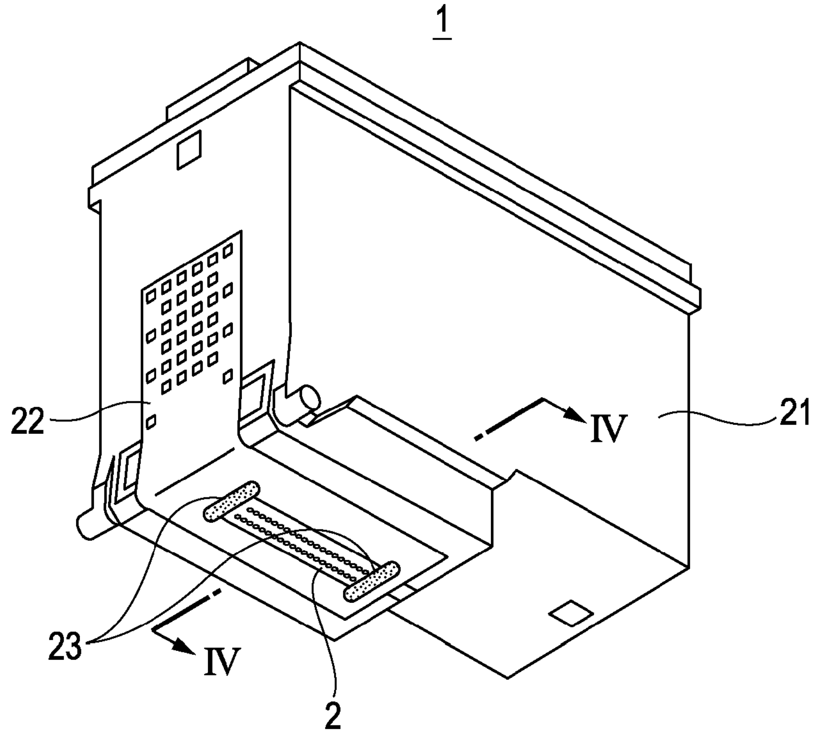
FIG. 3 is a schematic perspective view of a liquid ejection head according to an embodiment of the present invention.

FIG. 3 is a perspective view of a liquid ejection head according to an embodiment of the present invention. The liquid ejection head unit 1 according to this embodiment includes a liquid ejection head 2 configured to eject a liquid such as ink on a recording medium or the like, a case 21 configured to contain a liquid such as ink, and external signal input terminals 22 configured to receive external signals used for recording operation and the like. The liquid ejection head unit 1 has a structure such that the external signal input terminals 22 are electrically connected to an ink-jet recording apparatus when the liquid ejection head unit 1 is mounted on the ink-jet recording apparatus.

Electrical connection portions electrically connected to the external signal input terminals 22 are arranged at both ends of the liquid ejection head 2. The electrical connection portions are covered with sealing members 23, thereby preventing the contact between the electrical connection portions and a liquid ejected from the liquid ejection head 2.

Figure 4:
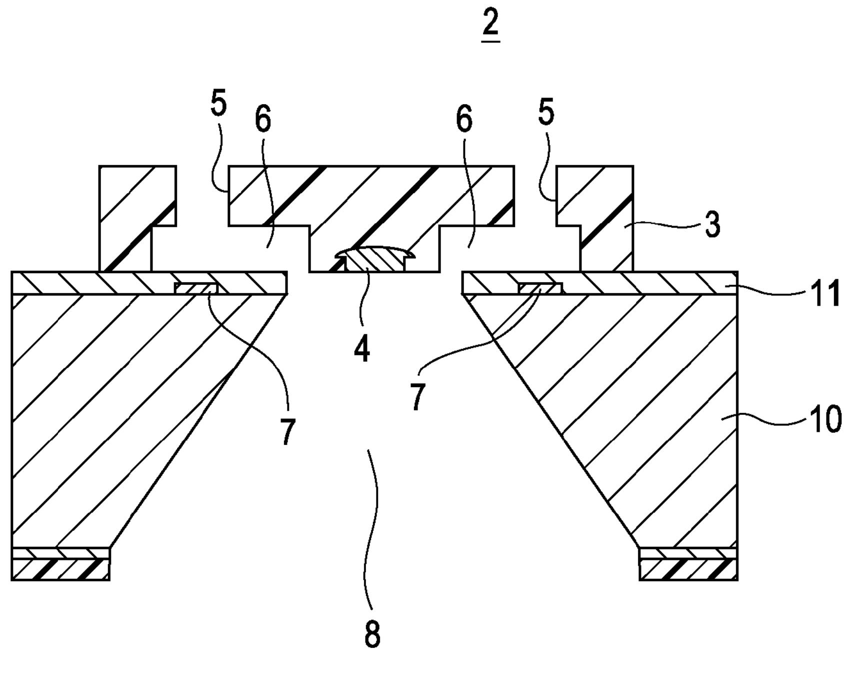
FIG. 4 is a schematic cross-sectional view of a liquid ejection head according to an embodiment of the present invention.

FIG. 4 is a cross-sectional view taken along line IV-IV in FIG. 3 which shows the liquid ejection head. The embodiment of the liquid ejection head 2 includes a silicon substrate 10 having a supply port 8 passing therethrough in the thickness direction; and a flow passage-forming member 3 arranged on a surface of the silicon substrate 10 and comprising a resin.

The flow passage-forming member 3 has ejection orifices 5 and flow passages 6 configured to allow the ejection orifices 5 to communicate with the supply port 8. Heating elements 7 comprising, for example, tantalum nitride or the like, and serving as energy-generating elements configured to generate energy used for the ejection of a liquid, are arranged in regions of the surface of the silicon substrate 10 corresponding to the flow passages 6. The surface of the silicon substrate 10 is entirely covered with a protective layer 11 comprising, for example, silicon nitride or the like. In the liquid ejection head 2, when the heating elements 7 generate heat, a liquid such as ink near the heating elements 7 may be instantaneously heated and boiled to generate a foam pressure. The liquid such as ink near the ejection orifices 5 can be ejected from the ejection orifices 5 by the pressure.

A heat-dissipating member 4 may be arranged on a surface of the flow passage-forming member 3 adjacent to the supply port 8. In the case of arranging the heat-dissipating member, the heat-dissipating member 4 is held by the flow passage-forming member 3 covering the periphery of the heat-dissipating member 4. An end of the heat-dissipating member 4 adjacent to the supply port 8 is not covered with the flow passage-forming member 3 and comes into contact with ink. The heat-dissipating member can comprise a material having a relatively high thermal conductivity. In this embodiment, the heat-dissipating member 4 comprises gold (Au) having relatively high thermal conductivity, relatively high ductility and malleability, and relatively high corrosion resistance.

Figure 5:
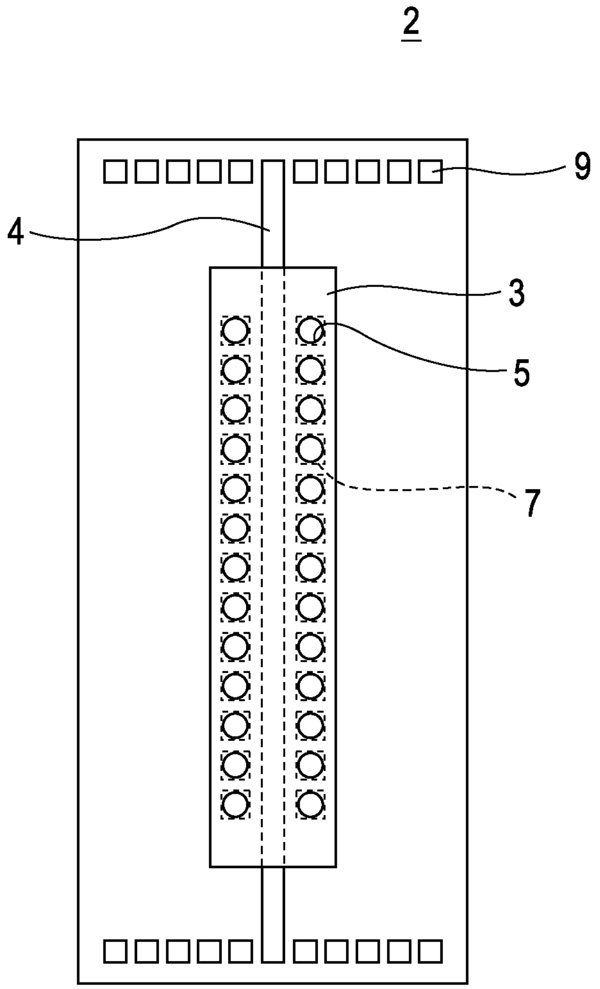
FIG. 5 is a top view of a liquid ejection head according to an embodiment of the present invention.

FIG. 5 is a front view of the embodiment of the liquid ejection head of the liquid ejection head unit shown in FIG. 3. In FIG. 5, the sealing members 23 are omitted for convenience of illustration.

According to the embodiment as shown, the heating elements 7 and the ejection orifices 5 are arranged in two rows. A plurality of electrode pads 9 that are electrically connected to the external signal input terminals 22 (see FIG. 3) are arranged at ends of the surface of the liquid ejection head 2 in the directions in which the heating elements 7 are arranged. Electric lines electrically connected to the electrode pads 9 are arranged on the surface of the liquid ejection head 2. External signals fed from the external signal input terminals 22 to the electrode pads 9 are transmitted to the heating elements 7 and the like through the electric lines.

The heat-dissipating member 4 according to this embodiment is linearly arranged along and between the two rows of the heating elements 7. That is, the heating elements 7 are located near the heat-dissipating member 4. The heat-dissipating member 4 may diffuse heat generated by the heating elements 7 in the directions in which the ejection orifices 5 are arranged. In the liquid ejection head 2, heat generated by the heating elements 7 is thus not accumulated in the vicinity of the heating elements 7 but may be diffused, suppressing an increase in temperature.

The heat-dissipating member 4 according to this embodiment is also connected to the substrate 10 via electrode pads 9 at both ends of the liquid ejection head 2; hence, heat generated by the heating elements 7 may be released toward the external signal input terminals 22 of the liquid ejection head unit 1 through the heating elements 7 and the electrode pads 9, thereby improving heat-dissipating properties of the liquid ejection head 2.

In one version, the heat-dissipating member 4 may be arranged so as to come into direct contact with a liquid, and thus may relatively efficiently dissipate the heat of ink and the like. This may successfully suppress an increase in the temperature of the liquid such as ink, thus preventing deterioration of the liquid.

As described above, the liquid ejection head unit 1 according to this embodiment may have higher heat-dissipating properties because the heat-dissipating member 4 may be capable of dissipating heat generated from the liquid ejection head 2.

A method for producing a substrate for a liquid ejection head according to a first embodiment of the present invention will be described below as an exemplary method for producing a substrate. FIGS. 1A to 1E are process drawings illustrating a method for forming a hole in a substrate according to this embodiment.

The method for forming a hole in a substrate according to this embodiment includes a preparation step, a laser stop layer formation step, a pilot hole formation step, and an etching step.

In the preparation step, a substrate 101 is prepared (see FIG. 1A). The substrate 101 may comprise, for example, silicon. Ejection energy-generating elements 103 configured to generate energy used for the ejection of a liquid are arranged on one surface of the substrate 101.

A sacrificial layer 106 is arranged on a portion of the one surface of the substrate 101, which portion will be perforated to form a through hole in a downstream step. The sacrificial layer 106 can comprise a material, such as for example at least one of aluminum, aluminum-silicon, aluminum-copper, and aluminum-silicon-copper, having a relatively high etch rate for an alkaline solution.

An etch stop layer 102 can be formed so as to cover the ejection energy-generating elements 103, the sacrificial layer 106, and the one surface of the substrate 101 before the laser stop layer formation step described below is performed. The etch stop layer 102 can comprise a material having resistance to an etching solution, i.e., etching resistance, and may serve as a protective layer configured to protect the ejection energy-generating elements 103. The etch stop layer 102 may comprise, for example, one or more of silicon oxide and silicon nitride.

Figure 1B:
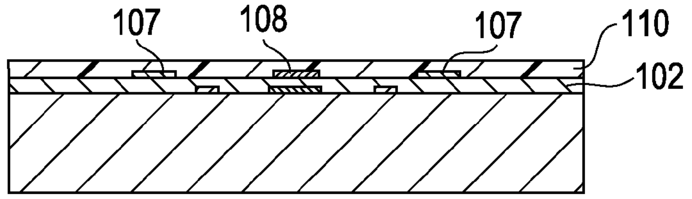

In the laser stop layer formation step, a laser stop layer 108 configured to suppress the transmission of laser light is formed on the one surface side of the substrate 101 (see FIG. 1B). Specifically, the laser stop layer 108 is formed on a portion of the one surface side of the substrate 101, the portion corresponding to where a pilot hole is to be formed in the downstream step.

The laser stop layer 108 may be arranged so as to correspond to the sacrificial layer 106 on the substrate 101, and may have a width comparable to that of the corresponding sacrificial layer 106.

The laser stop layer 108 is capable of suppressing the transmission of laser light and has resistance to laser light. The laser stop layer 108 may comprise a material having a sufficiently lower absorptivity of a laser light that is used in the downstream step than that of the substrate. Examples of the material may include metal materials, such as at least one of gold (Au), silver (Ag), and copper (Cu). The layer comprising the metal material may be formed by plating.

In a substrate used for liquid ejection, electric line layers 107 and a nozzle material layer 110 as a material layer are further formed on the one surface side of the substrate 101. The electric line layers 107 may be arranged so as to provide power to the ejection energy-generating elements 103. The nozzle material layer 110 can include ejection orifices configured to eject a liquid and nozzles communicating with the respective ejection orifices. The laser stop layer 108 is covered with the nozzle material layer as the material layer.

Figure 1C:
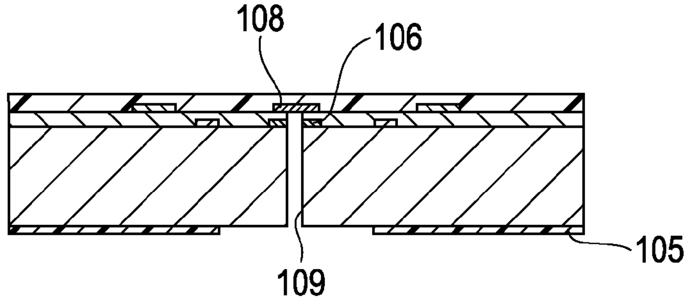

In the pilot hole formation step, the substrate 101 is irradiated with laser light from the other surface opposite the one surface of the substrate 101 to form a hole (hereinafter, referred to as a pilot hole 109) extending from the other surface and communicating with the laser stop layer 108 (see FIG. 1C).

Specifically, an etch mask layer 105 having an opening is formed on the other surface opposite the one surface of the substrate 101. The substrate 101 is irradiated with laser light through the opening. In the pilot hole formation step, the pilot hole 109 may be formed by ablation with laser light.

The etch mask layer 105 has the opening corresponding to the laser stop layer 108 arranged on the one surface side of the substrate 101. The etch mask layer 105 may comprise, for example, a polyether amide resin.

The laser stop layer 108 may sufficiently suppress the transmission of the laser light, is not substantially processed, and may reflect the laser light. Thus, there may be little or no need to precisely control the output power of the laser light. This facilitates the formation of the pilot hole 109.

Furthermore, since the laser stop layer 108 does not transmit the laser light, it may be possible to prevent damage to the nozzle material layer 110 as the material layer arranged on the one surface side of the substrate 101.

According to this embodiment, the fundamental wave (wavelength: 1,064 nm) of a YAG laser may be used as the laser light. The frequency of the laser light may be appropriately set. In this embodiment, the laser stop layer 108 comprises gold (Au). Gold has a relatively low absorptivity of laser light having a wavelength of 1,064 nm, which is the wavelength of the fundamental wave of the YAG laser, of about 2%, and resistance to the laser light.

In contrast, the silicon constituting the substrate 101 has an absorptivity of the fundamental wave of the YAG laser of 10% or more. Thus, the silicon substrate can be processed by irradiation with the laser light to form the pilot hole 109.

Figure 1D:
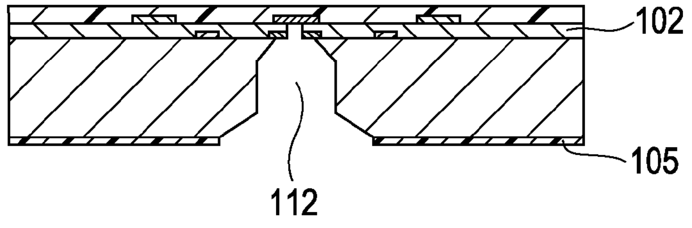

In the etching step, anisotropic etching, such as wet etching, is performed so as to increase the diameter of the pilot hole 109 to a predetermined value (see FIG. 1D). Specifically, etching is performed with the etch mask layer 105 serving as a protective film having resistance to an etching solution to increase the diameter of the pilot hole 109 to the predetermined value. Thereby, a hole 112 having a predetermined diameter may be formed in the substrate 101.

According to this embodiment, tetramethylammonium hydroxide (TMAH) may be used as the etching solution. The etch stop layer 102 arranged in the vicinity of the bottom of the pilot hole 109, between the laser stop layer 108 and the substrate 101, has etching resistance, and thus protects the ejection energy-generating elements 103 and the nozzle material layer 110 from the etching solution.

It can be difficult to emit laser light having a circular cross section in the pilot hole formation step. Thus, it can be difficult to form a pilot hole 109 having a circular cross section. Furthermore, the pilot hole 109 formed by irradiation with laser light may have an uneven wall. Moreover, it can take a considerable amount of time to form a pilot hole 109 having an increased diameter by irradiation with laser light.

Therefore, the hole 112 having the predetermined diameter may be stably formed by forming the pilot hole 109 having a smaller diameter using laser light, and then increasing the diameter of the pilot hole 109 in the etching step. In addition, the etching solution enters the pilot hole 109, thus significantly reducing the time (AE time) for anisotropic etching to improve production efficiency.

In the case where the hole 112 formed in the substrate 101 is used as a liquid supply port of a liquid ejection head, the sacrificial layer 106 and part of the etch stop layer 102 present in the vicinity of the bottom of the hole 112 may be removed.

In FIGS. 1A to 1D, only a single hole 112 is shown as being formed in the substrate 101. A plurality of holes, however, may also be simultaneously formed.

In the foregoing embodiment, the structure in which the nozzle material layer is formed on the one surface side of the substrate 101 has been described. However, the material layer is not limited to the nozzle material layer. An example of the material layer is a resin layer. According to an embodiment of the present invention, the material layer covering the laser stop layer can be protected from laser light in the pilot hole formation step.

An embodiment of a method for producing a liquid ejection head employing the method for producing a substrate according to the first embodiment will be described in detail below (i.e., a second embodiment according to aspects of the invention). Examples of the liquid ejection head include ink-jet heads configured to eject liquid ink to perform recording, as well as heads configured to eject microdroplets of liquids incorporated into inhalators and the like, which may be used when liquid drugs are nebulized and inhaled into the lungs in medical applications.

FIGS. 2A to 2F are process drawings illustrating a method for producing a liquid ejection head according to this embodiment. The method for producing a liquid ejection head includes a preparation step, an electric line layer formation step, a laser stop layer formation step, a laser stop layer formation step, a nozzle material layer formation step, a pilot hole formation step, and an etching step.

Figure 2A:
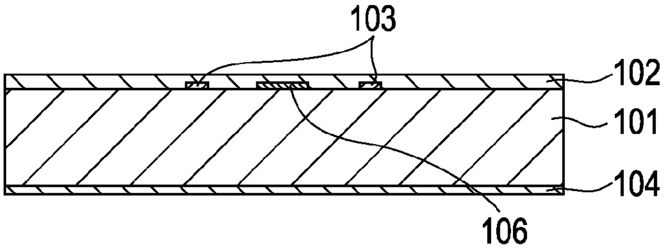
FIGS. 2A to 2F are schematic cross-sectional views of a method for producing a liquid ejection head according to an embodiment of the present invention.

In the preparation step, the substrate 101 is prepared (see FIG. 2A). The ejection energy-generating elements 103 configured to generate energy used for the ejection of a liquid from the liquid ejection head are arranged on one surface of the substrate 101. Any arrangement of the ejection energy-generating elements 103 on the substrate 101 may be used.

For example, heaters may be used as the ejection energy-generating elements 103. Examples of the heaters include thermoelectric transducers (e.g., TaN). The ejection energy-generating elements 103 are electrically connected to input electrodes. Control signals that drive the ejection energy-generating elements are sent through the input electrodes.

In this embodiment, a silicon (100) substrate is used as the substrate 101. The substrate 101 has a thickness of about 625 μm. The sacrificial layer 106 is arranged on the one surface of the substrate 101. The same arrangement and materials of the ejection energy-generating elements 103 and the sacrificial layer 106 are used as in the first embodiment. The other surface opposite the one surface of the substrate 101 is covered with an oxide film 104.

Like the first embodiment, the etch stop layer 102 can be formed so as to cover the one surface side of the substrate 101 before the laser stop layer formation step is performed (i.e., between the substrate 101 and the laser stop layer 108). The etch stop layer 102 comprises a material having etching resistance.

Figure 2B:
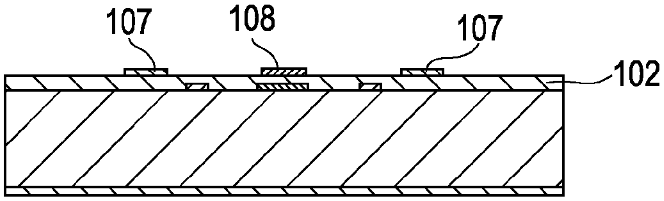

Next, the electric line layer formation step and the laser stop layer formation step are performed (see FIG. 2B). In the electric line layer formation step, the electric line layers 107 configured to provide power to the ejection energy-generating elements 103 are formed on the one surface side of the substrate 101. The electric line layers 107 can be patterned by plating. The electric line layers 107 may comprise a metal, such as for example gold (Au).

In the laser stop layer formation step, the laser stop layer 108 is formed on the one surface side of the substrate 101, i.e., the laser stop layer 108 is formed on one surface of the etch stop layer 102. The laser stop layer formation step may be performed as in the first embodiment.

According to this embodiment, the laser stop layer 108 and the electric line layers 107 can comprise the same material, such as the same metal. In this case, the electric line layer formation step and the laser stop layer formation step can be simultaneously performed, thereby reducing production time.

In the case where the electric line layer formation step and the laser stop layer formation step are simultaneously performed, each of the electric line layers 107 and the laser stop layer 108 can have a thickness of 0.5 μm to 5.0 μm. This is because, in this case, the electric line layers 107 have a relatively low electrical resistance, and the nozzle material layer may have a flat surface (in which ejection orifices can be formed in a downstream step).

A thickness of each electric line layer 107 of less than 0.5 μm may result in an increase in line resistance. Also, when the electric line layer 107 and the laser stop layer 108 each have a thickness exceeding 5.0 μm, the nozzle material layer may have an uneven surface. The unevenness of the surface of the nozzle material layer is one of the factors that can reduce the liquid ejection performance.

Figure 2C:
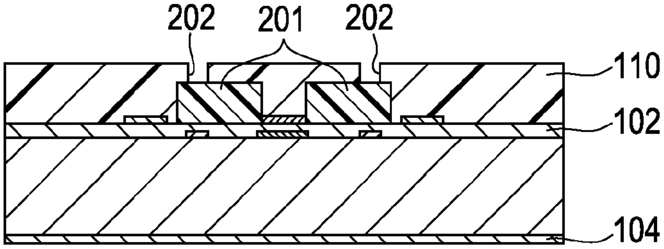

In the nozzle material layer formation step, the nozzle material layer 110 is formed on the one surface side of the substrate 101 (see FIG. 2C). The nozzle material layer 110 includes ejection orifices 202 formed therein configured to eject a liquid from the liquid ejection head, and nozzles 203 communicating with the respective ejection orifices 202 (see FIG. 2F).

Specifically, mold material layers 201 are stacked on portions of the one surface side of the substrate 101, which portions of the surface side will be formed into nozzles. The mold material layers 201 may comprise a positive resist. Then a photosensitive resin serving as a material of the nozzle material layer 110 is applied to the one surface side of the substrate 101. The ejection orifices 202 can be formed by exposing and developing the nozzle material layer 110.

The nozzle material layer formation step is not limited to the foregoing process, but may also be performed by any process described in the related art.

Figure 2D:
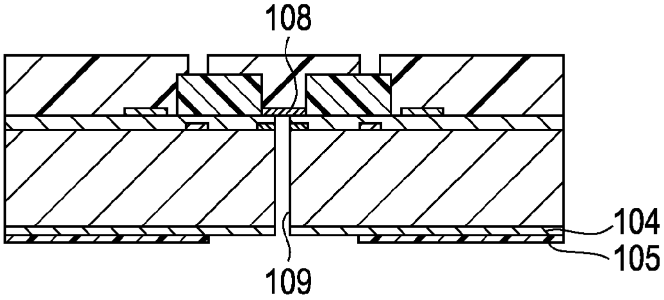

In the pilot hole formation step, the substrate 101 is irradiated with laser light from the other surface opposite the one surface of the substrate 101, to form the pilot hole 109 extending from the other surface and communicating with the laser stop layer 108 (see FIG. 2D). The pilot hole formation step may be performed as in the first embodiment.

In this embodiment, the pilot hole 109 has a diameter of about 40 μm. The pilot hole 109 can also have a diameter of, for example, from about 5 μm to about 100 μm. In the case of an excessively small diameter, an etching solution may not easily enter the pilot hole 109 in the etching step performed later. In the case of an excessively large diameter, it may take a considerable amount of time to form the pilot hole 109.

Figure 2E:
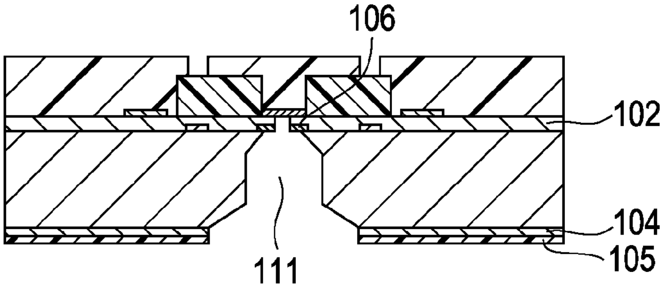

In the etching step, anisotropic etching is performed so as to increase the diameter of the pilot hole 109 to a predetermined value, thereby forming a liquid supply port 111 (see FIG. 2E). Specifically, the oxide film 104 exposed at the opening of the etch mask layer 105 is removed, with the etch mask layer 105 according to this embodiment comprising a polyether amide resin serving as a protective film.

Then the substrate 101 is subjected to anisotropic etching as in the first embodiment. Thereby, the pilot hole 109 may be formed into the liquid supply port 111.

Figure 2F:
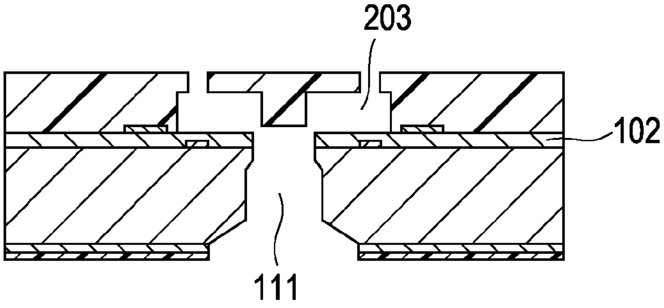

Removal of the sacrificial layer 106 and part of the etch stop layer 102 present in the vicinity of the bottom of the liquid supply port 111 may be performed to permit the liquid supply port 111 to communicate with the nozzles 203 formed in the nozzle material layer 110 (see FIG. 2F). Furthermore, the laser stop layer 108 may be removed.

Specifically, according to this embodiment the sacrificial layer 106 may be removed by isotropic etching. A portion of the etch stop layer 102 that has been in contact with the sacrificial layer 106 is also removed by etching. The mold material layers 201 covered with the nozzle material layer 110 are also removed, thereby providing a liquid ejection head. The mold material layers 201 can be removed by having the layers 201 entirely irradiated with far-ultraviolet rays, dissolved, and removed.

In this embodiment, the time for anisotropic etching (AE time) in the etching step may be 1 hour. In contrast, in the case where the liquid supply port is formed by the etching step alone, without performing the pilot hole formation step, the AE time can be 16 hours. The formation of the pilot hole 109 in the pilot hole formation step performed before the etching step may this result in a significant reduction in production time.

Furthermore, the reduction in AE time may result in a reduction in the diameter of the liquid supply port 111. Thus, in the case where a plurality of liquid supply ports 111 are formed in the substrate 101, the distance between the liquid supply ports 111 can be reduced, thereby resulting in a reduction in the size of the liquid ejection head.

In the foregoing embodiment, the method for producing a substrate for liquid ejection has been described with reference to the drawings of a single substrate. The substrate 101 can furthermore be produced on a wafer basis. The order of the foregoing steps may be rearranged to the extent suitable.

Accordingly, aspects of the above embodiments provide a method for stably forming a hole in a substrate with relatively high production efficiency. Aspects of the above embodiments also provide a method for producing a liquid ejection head using the above-described method.

While these embodiments of the invention have been described in detail above, it is to be understood that the invention is not limited to these embodiments, and that various changes and modifications can also be made without departing from the scope of the invention.

Figure 6A:
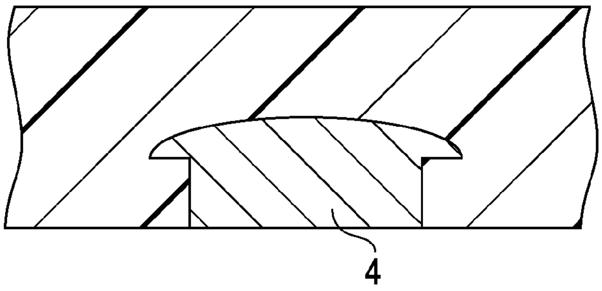
FIGS. 6A to 6D are enlarged schematic cross-sectional views of a heat-dissipating member and a portion near the heat-dissipating member of a liquid ejection head according to an embodiment of the present invention.

FIG. 6A is an enlarged cross-sectional view of the heat-dissipating member 4 of the liquid ejection head shown in FIG. 4, corresponding to a third embodiment according to the invention. The heat-dissipating member 4 has a mushroom shape in cross section. A pileus portion (i.e., cap portion) covered with the flow passage-forming member 3 serves as a locking portion to prevent the detachment of the heat-dissipating member 4 from the flow passage-forming member 3. Thus, it is possible to prevent the detachment of the heat-dissipating member 4 from the flow passage-forming member 3 due to, for example, a force acting on the heat-dissipating member 4 from a liquid flowing into the flow passages 6 through the supply port 8.

Figure 6B:
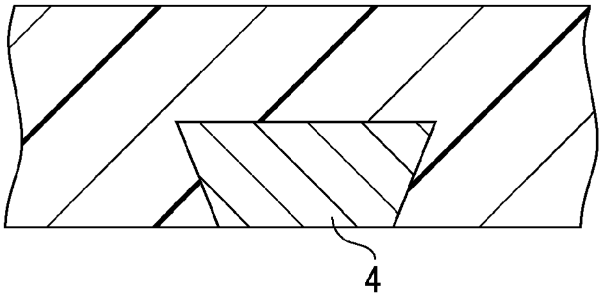
Figure 6C:
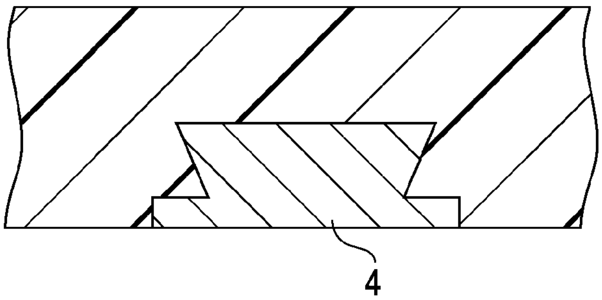
Figure 6D:
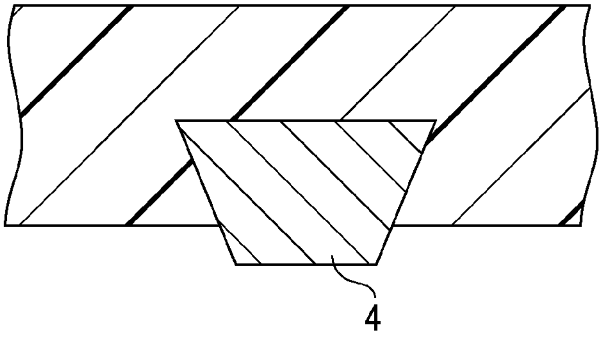

The shape of the heat-dissipating member is not limited to the mushroom shape as shown in FIG. 6A. The heat-dissipating member 4 may also have a locking portion to prevent the detachment of the heat-dissipating member 4 from the flow passage-forming member 3. For example, as shown in FIG. 6B, in the case of a tapered shape that tapers from the inside to the surface of the flow passage-forming member, side faces of the tapered heat-dissipating member can serve as locking portions to prevent the detachment of the heat-dissipating member from the flow passage-forming member. As shown in FIG. 6C, in order to increase the area of a portion that comes into contact with a liquid, the heat-dissipating member having a large-area portion exposed at a surface of the flow passage-forming member can also be formed, to improve heat dissipation properties. As shown in FIG. 6D, the heat-dissipating member can also be formed so as to protrude from the surface of the flow passage-forming member, thereby increasing the area of a portion of the heat-dissipating member that comes into contact with a liquid.

Referring to FIGS. 7A to 7F, a method for producing a liquid ejection head according to this embodiment will be described below. FIGS. 7A to 7F are cross-sectional views of a liquid ejection head according to this embodiment in the course of the production process. In FIGS. 7A to 7F, a single liquid ejection head 2 is illustrated. However, after processing is performed on a wafer basis, the processed wafer may also be subjected to dicing, thereby affording individual liquid ejection heads 2.

Figure 7A:
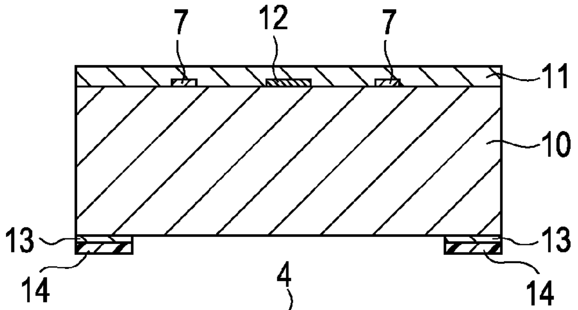
FIGS. 7A to 7F are schematic cross-sectional views of a method for producing a liquid ejection head according to an embodiment of the present invention.

As shown in FIG. 7A, the silicon substrate 10 having the heating elements 7, an etching sacrificial layer 12, and the protective layer 11 is prepared, the heating elements 7 and the etching sacrificial layer 12 being arranged on an upper surface of the silicon substrate 10, and the protective layer 11 covering the entire upper surface. The silicon substrate 10 also has silicon dioxide layers 13 and polyamide layers 14 serving as etching masks arranged on the other surface (lower surface) of the silicon substrate 10. The heating elements 7 may be provided with control signal input electrodes electrically connected to the electrode pads 9 through electric lines. A silicon (100) substrate having a thickness of 625 μm may be used in this embodiment as the silicon substrate 10.

Figure 7B:
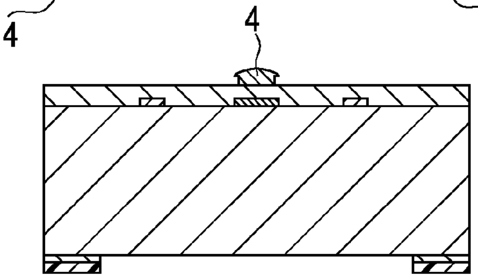

As shown in FIG. 7B, the heat-dissipating member 4 is formed on a portion located on the upper surface side of the silicon substrate 10, the portion being located opposite the etching sacrificial layer 12. The heat-dissipating member 4 according to this embodiment comprises gold, and has a thickness of about 4 μm. The width of the end of the heat-dissipating member 4 adjacent to the supply port 8 (see FIG. 7F) is about 40 μm.

A larger thickness of the heat-dissipating member can result in an increase in thermal conductivity, and may thus improve heat-dissipating properties. Attempts were made to form the heat-dissipating member having a larger thickness. In the case of a thickness exceeding 5.0 μm, nonuniformity in shape was observed, in some cases. In the case of a thickness of 5.0 μm or less, nonuniformity in shape was not observed. A heat-dissipating member having a nonuniform shape may have a portion that does not successfully dissipate heat. Thus, according to this embodiment, the heat-dissipating member may have a thickness of 5.0 μm or less.

In the step of forming the heat-dissipating member 4, the electrode pads 9 and electric lines comprising gold may also be formed. In one version the heat-dissipating member 4, the electrode pads 9, and the electric lines, may comprise a material having the same composition, and thus can be formed in the same step, thereby improving production efficiency.

Figure 7C:
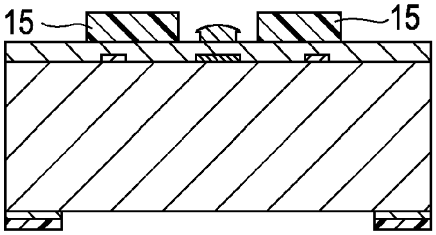

As shown in FIG. 7C, flow passage pattern layers 15 are formed on portions on the upper surface side of the silicon substrate 10, the portions being located in the vicinity of the heating elements 7. The flow passage pattern layers 15 are portions that will be removed to be formed into the flow passages 6 (see FIG. 7F); hence, the flow passage pattern layers 15 can comprise a positive photosensitive resin that can be relatively easily dissolved and removed. According to this embodiment, a solution of the positive photosensitive resin dissolved in a solvent is applied to the upper surface side of the silicon substrate 10, exposed, and developed with methyl isobutyl ketone to form flow passage pattern layers 15 having a thickness of 12 μm. Exposure may be performed with an exposure apparatus UX-3000 (trade name, manufactured by Ushio Inc).

Figure 7D:
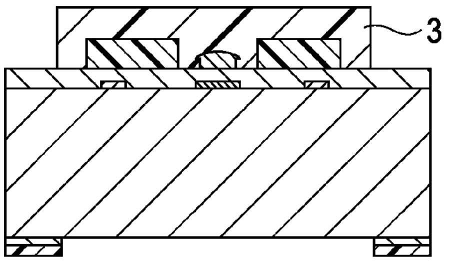

As shown in FIG. 7D, the flow passage-forming member 3 is formed on the upper surface side of the silicon substrate 10. For example, a solution of a negative photosensitive resin dissolved in methyl isobutyl ketone may be applied and pre-baked at 90° C. for 4 minutes to form the flow passage-forming member 3. A resin composition comprising an epoxy resin and a photo-cationic polymerization initiator may be used as the negative photosensitive resin. The flow passage-forming member 3 can be formed so as to cover the heat-dissipating member 4, and also so as not to expose the heat-dissipating member 4.

Figure 7E:
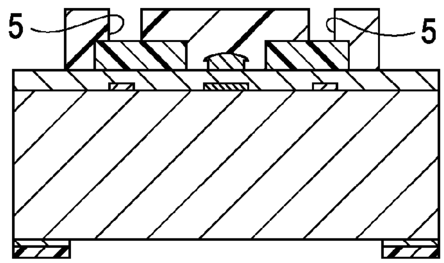

As shown in FIG. 7E, the ejection orifices 5 are formed in the flow passage-forming member 3. The flow passage-forming member 3 can be exposed with an ejection orifice mask pattern and developed with methyl isobutyl ketone to form the ejection orifices 5 each having, for example, a diameter of 10 μm. Exposure may be performed with a mask aligner MPA-600 Super (trade name, manufactured by CANON KABUSHIKI KAISHA).

Figure 7F:
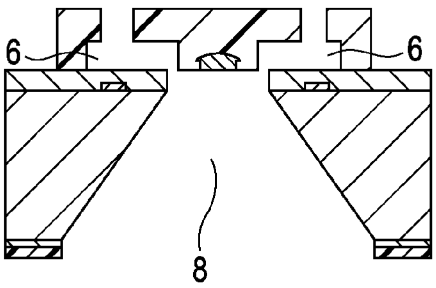

As shown in FIG. 7F, the supply port 8 and the flow passages 6 are formed. The supply port 8 may be formed, similarly to the first and second embodiments by passing laser light from the lower surface towards the upper surface of the silicon substrate 10 and allowing the laser light to reach the heat-dissipating member 4, and then etching the silicon substrate 10, for example anisotropically, so as to form a through hole extending from the lower surface to the upper surface. The flow passages 6 are formed by removing the flow passage pattern layers 15 from the supply port 8 and the ejection orifices 5. The formation of the supply port 8 exposes the heat-dissipating member 4 at a position facing the supply port.

The flow passage-forming member 3 may be completely cured to provide the liquid ejection head 2. For example, the flow passage-forming member 3 may be cured at 200° C. for 1 hour.

Liquid ejection heads including heat-dissipating members having various thicknesses were produced in the same process. A continuous recording test was performed with an ink BCI-7C (trade name, manufactured by CANON KABUSHIKI KAISHA). When the heat-dissipating member had a thickness of less than 0.5 μm, a reduction in the quality of recorded images was observed. When the heat-dissipating member had a thickness of 0.5 μm or more, good quality of recorded images was maintained. The results demonstrated that a thickness of the heat-dissipating member of 0.5 μm or more resulted in efficient suppression of an increase in the temperature of the liquid ejection head.

In the method for producing a liquid ejection head according to this embodiment, the heat-dissipating member is arranged in the flow passage-forming member, at a position where the flow passage-forming member faces the supply port 8. Alternatively, the heat-dissipating member may be arranged near the heating elements and at a position such that the heat-dissipating member comes into contact with a liquid such as ink to be ejected. For example, in the case where the heat-dissipating member is arranged on a portion of the protective layer located in the flow passage, the same effect may also be obtained.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-159124 filed Jun. 18, 2008 and No. 2008-159116 filed Jun. 18, 2008, which are hereby incorporated by reference herein in their entireties.

What is claimed is:

1. A method for processing a substrate, the method comprising:

preparing a substrate having a sacrificial layer, a first layer, and an electric layer at a first surface side thereof, the sacrificial layer comprising at least one of aluminum, aluminum-silicon, aluminum-copper, and aluminum-silicon-copper, the first layer comprising a material capable of suppressing transmission of laser light, and the sacrificial layer being disposed closer to the substrate than the first layer;

processing the substrate with laser light from a second surface that is opposite the first surface of the substrate toward the first surface of the substrate, and allowing the laser light to penetrate the sacrificial layer to reach the first layer to form a hole in the substrate; and performing etching of the substrate from the second surface through the hole, wherein the first layer and the electric layer are formed in simultaneous steps.

2. The method according to claim 1, wherein the hole is formed in the substrate by ablation with the laser light.

3. The method according to claim 1, wherein the laser light is the fundamental wave of a YAG laser.

4. The method according to claim 1, wherein the material comprises at least one of gold, silver, and copper.

5. The method according to claim 1, wherein the etching is wet etching.

6. The method according to claim 5, wherein a second layer comprising a material having resistance to an etching solution for use in wet etching is arranged between the substrate and the first layer, and wherein etching is performed in such a manner that the etching solution reaches the second layer.

7. The method according to claim 1, wherein the first layer has a thickness of 0.5 μm to 5.0 μm.

8. A method for producing a substrate used for a liquid ejection head, the substrate having an energy-generating element and an electric layer on a first surface thereof and a supply port, the energy-generating element being configured to generate energy used for the ejection of a liquid, and the supply port being configured to allow the first surface to communicate with a second surface opposite the first surface of the substrate and supply the energy-generating element with a liquid, the method comprising:

preparing the substrate having a first layer and the electric layer on the first surface side thereof, the first layer comprising a material capable of suppressing transmission of laser light;

processing the substrate with laser light from the second surface that is opposite the first surface of the substrate toward the first surface of the substrate, and allowing the laser light to reach the first layer to form a hole in the substrate; and performing etching of the substrate from the second surface through the hole to form the supply port, wherein the first layer and the electric layer are formed in simultaneous steps.

9. The method according to claim 1, wherein the first layer has a mushroom shape in cross section.

10. The method according to claim 1, wherein the first layer has such a taper shape in cross section that a width thereof is smaller toward the substrate.

11. The method according to claim 1, wherein the first layer has such a shape in cross section that a width of a surface closest to the substrate is larger than a width of a surface farthest from the substrate.

12. The method according to claim 8, wherein the first layer has a tapered shape in cross section.

13. The method according to claim 8, wherein the first layer has such a tapered shape in cross section that a width thereof is smaller toward the substrate.

14. The method according to claim 8, wherein the first layer has such a shape in cross section that a width of a surface closest to the substrate is larger than a width of a surface farthest from the substrate.

* * * * *